May 4, 1937.  R. R. CLARK  2,079,152
METHOD OF INDUCTIVE HEATING
Filed April 22, 1936
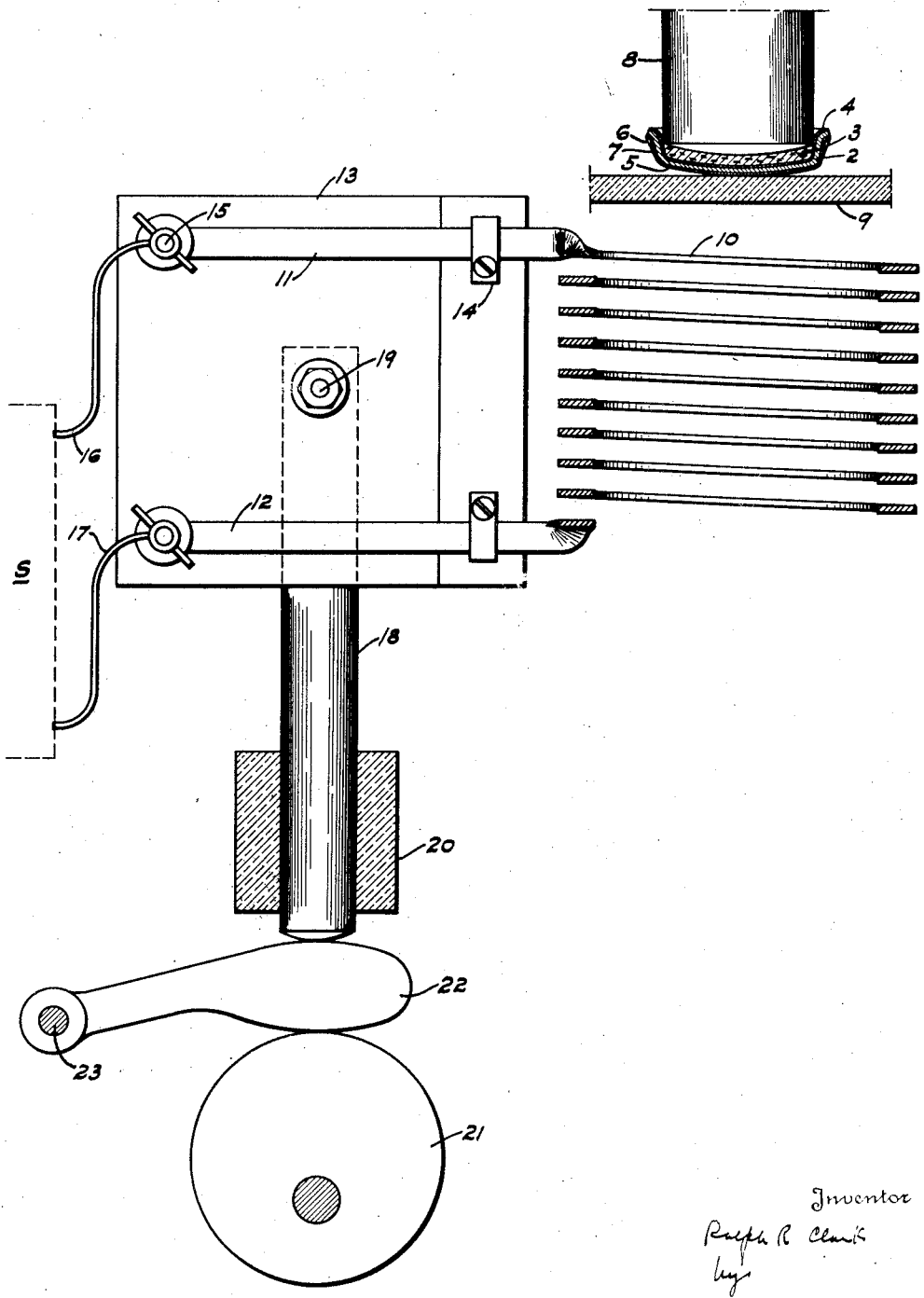

Patented May 4, 1937

2,079,152

UNITED STATES PATENT OFFICE 2,079,152

METHOD OF INDUCTIVE HEATING

Ralph R. Clark, Lancaster, Pa., assignor to Armstrong Cork Company, Lancaster, Pa., a corporation of Pennsylvania Application April 22, 1936, Serial No. 75,844

7 Claims. (Cl. 219—13)

My invention relates to a method of inductive heating and contemplates a method in which heat is generated in an electrical current conducting material by a series of electric inductive actions therein, to soften or activate a heat activatable material disposed in the heating zone thereof. This invention is particularly adaptable for use in the assembly of closures wherein a sealing liner is secured to a metal shell by means of a heat activatable adhesive disposed between the shell and liner. In such closures, the shell is formed of tin coated steel plate which has provided on its outer surface a decorative coating which may be in the form of a lithographed design. This coating is customarily protected by a film of lacquer or varnish and the inner surface of the shell may also be provided with a protective coating, if desired. As is common with all decorative coatings of this type, heat above a limited temperature has a tendency to "yellow" the lighter colors and shriveling and checking of the decoration is encountered if elevated temperatures are reached. When the decorative coating is in softened condition, it is particularly susceptible to marring and it is desirable, therefore, to eliminate substantially all relative movement between the shell and support which carries it while the decoration is in such softened condition.

One of the most commonly employed adhesives for securing liners to metal shells in bottle closure assembly is adhesive lacquer which is disposed over the entire surface area of the tin plate prior to formation of the shells. This adhesive is thermoplastic and activatable at a relatively low temperature; approximately 240° F. being sufficient to activate the adhesive lacquers commonly employed. Egg albumen is another activatable adhesive extensively used; the reaction there being heat coagulation rather than a thermoplastic reaction as with adhesive lacquer. Egg albumen is coagulated at about 180° F. and requires little or no cooling after coagulation; the entire activating action being complete upon coagulation. Adhesives embodying latex or rubber are sometimes used and the heat activation in such event may be partial or complete vulcanization or solvent elimination. Animal glue may be used since it, also, is heat activatable, the reaction being to drive off the water or other solvent employed. The term "activated" is intended to comprehend the change of physical or chemical state of the adhesive, rendering it effective for the purpose intended.

In all of the prior methods, activation of the adhesive was effected by means of a gas flame directing heat against the decorated surface of the closure shell and such heat was dissipated through the metal until a temperature sufficient to activate the adhesive was reached on the inner surface of the shell. After heating, with the use of adhesive lacquer and other adhesives requiring cooling under pressure, the shells and liners were passed from the heating zone into a pressure applying drum and cooling was effected therein with the shells and disks under pressure. This prior practice has resulted in marred decorations, since transfer of the shells from the heating zone to the cooling drum has always been effected at the moment when the decoration is in a softened condition and most susceptible to marring.

My copending application, Serial Number 72,489, filed April 3, 1936, and entitled, "Closure assembly apparatus" discloses a machine for assembling closures, utilizing induction heating by high frequency currents to activate an adhesive, in which all relative movement between the closure shells and their support while the decoration is in heated condition, is obviated.

In another copending application, Serial Number 33,205, filed July 26, 1935, and entitled, "Method of making closures", I have illustrated and described a method of assembling closures by inductively heating a conducting portion, forming part of the closure, in an amount sufficient to activate a heat activatable material disposed in the heating zone thereof. This case is directed broadly to a method including the step of generating heat within a conducting portion of the closure to effect heat activation of a material, whether the activatable material be an adhesive or the lining material itself.

In another copending application of Emil R. Capita, Serial Number 33,336, filed July 26, 1935, and entitled, "Method and apparatus for securing elements together" there is disclosed a method of securing elements together by means of a heat activatable bonding agent in which the element to be heated is moved with a radiating coil effective for generating heat within the element. There is also disclosed a method by which preferential heating of the head portion of the closure shell may be effected without any excessive heating of the decorative material disposed thereon.

According to the present method, heating is effected by a plurality of steps while heat equalization throughout the member to be heated is effected between such steps until the desired temperature is reached within the element to be heated. I have found, with closure shells, and particularly those of the crown closure type, that when an alternating field is created to transverse the shell at substantially right angles to the top portion thereof, or parallel to the axis of the shell, the phenomenon known as "skin effect" will cause the outer or flanged portion of the shell to heat first. I have further found that if such heating in the flange portion be effected for a period of time sufficient to elevate the temperature of the head portion to a degree sufficient to activate adhesive lacquer, for example, the skirt or flanged portion will have become heated to a temperature deleterious to the decoration applied to the outer surface thereof. As a result, I have discovered that, by heating in a plurality of steps and generating the heat within a particular portion of the shell—the flanged portion of a crown shell, for example—heat is conducted from such portion to other portions of the closure desired to be heated and the temperature of the particular portion where heating is effected need not be elevated to a degree sufficient to affect the decoration thereon.

In order that my invention will be more readily understood, I will describe an embodiment thereof in connection with the attached drawing, in which the single figure is a schematic view showing an apparatus suitable for carrying out my method.

In the embodiment illustrated, a closure shell 2 is to be assembled with a sealing liner 3 made of cork composition. A stratum of adhesive 4, which is shown to exaggerated scale is disposed between the disk 3 and the head portion 5 of the closure shell 2. It will be noted that the adhesive layer 4 also extends over the skirt or flanged portion 6 of the shell 2. This is occasioned by reason of the fact that it is common practice to coat the tin plate from which the shell 2 is to be formed with adhesive and dry the same prior to formation of the shells, and to provide the other surface with a decorative coating 7 which may be in the form of a lithographed design. The coating 7 is also shown to exaggerated scale. A plunger 8 is illustrated, diagrammatically, for applying pressure between the liner 3 and the shell 2 positioned upon a support 9 where the assembling operation is carried out. This support is constructed of an electrical current insulating material, such as "bakelite".

The adhesive material 4 disposed between the shell 5 and the liner 3, and serving to secure the elements together, is of a heat activatable character, and may, for illustrative purposes, be referred to as adhesive lacquer which is thermoplastic and may be rendered adhesive at about 240° F. In order to effect such heat softening or activation, a high frequency inducing coil 10 is provided which comprises a helically disposed ribbon of copper forming a generally open, hollow, cylindrical coil. The ends 11 and 12 of the coil 10 are secured to a nonconducting strip 13 by means of clamps 14 and bolts 15. Pig-tail connections 16 and 17 are provided and are connected with the out-put of a source of high frequency current S. I prefer to use a quenched spark gap oscillator of the type described in the copending application of Emil R. Capita, Serial Number 33,337 filed July 26, 1935, and entitled, "Heating apparatus and supply therefor", although other types of high frequency oscillators may be employed with good results.

The supporting strip 13 is mounted upon a reciprocating plunger 18 also of nonconducting material. The plunger 18 has a flat surface lying in engagement with the coil support 13 and is secured by a bolt 19 passing through the plunger 18 and the support 13. The plunger 18 is guided in a nonconducting bearing 20, and reciprocatory motion is imparted thereto by a driven cam 21 through a cam follower 22 pivoted at 23. The cam is adapted to move the coil 10 away from the support 9 a distance sufficient to withdraw the field of flux of the coil from the element to be heated, or at least a distance sufficient to diminish the flux threading the element to a degree sufficient to permit heat equalization therein, as will be more fully hereinafter described.

As heretofore pointed out, when heating metallic elements of the type here under consideration by submitting them to the field of flux of an electrical current inducing coil disposed so that the field generated by the coil cuts the member at substantially right angles to the plane of the top portion thereof, or parallel to the axis in the present instance, heat is generated in the peripheral portion due to "skin effect". In the illustrated embodiment, with the type of coil shown, heat will be generated primarily in the flanged portion 6 of the shell 2. The temperature to which the metallic member will be elevated is dependent to a considerable extent upon the time cycle in which it lies within the field of flux of the coil 10, and, if the generation of heat to be carried on in a single step, the peripheral portion 6, constituting the flange of the shell, will become overheated, thus damaging or completely destroying the decorative material disposed thereover. By imparting vertical movement to the coil 10 so as to move the field of flux thereof out of the zone of the shell 2 on the support 9 and permitting the heat generated in the peripheral or flange portion 6 to become dissipated throughout the shell, including the top portion 5 thereof, the temperature of the entire shell may be effectively raised to a desired degree without creating too high a temperature in the flange portion 6. For example, when utilizing a coil of the type shown and energizing the same by means of a high frequency quenched spark gap oscillator having an output of 300,000 cycles, and operating upon a crown shell made of 110 pound tin plate having an overall diameter of approximately 1¼ inches, I found that by maintaining the field of flux so that it embraces the shell for a period of one second and then moving the coil away from the shell so that the shell is not embraced by the field of flux for a period of one-half second and repeating this cycle for four and one-half seconds, or in other words, generating heat in the disk in a series of three spaced intervals, the temperature of the head portion 5 may be elevated to 240° F. without materially exceeding that temperature in the peripheral portion 6.

Another device suitable for effecting the generation of heat within the metallic member in a plurality of spaced steps may take the form of a quenched spark-gap high frequency oscillator provided with a switching mechanism, mechanically controlled, adapted to reduce the current supply to the primary of the oscillator to an amount insufficient to effect striking of the spark gaps, thus the secondary circuit is not charged and the inducing coil or coils fed by the out-put of the secondary are not energized. The mechanical control for the switch should be arranged to provide the desired energization and deenergization periods for the inducing coil or coils to effect heating of the elements to be operated upon and to permit the necessary heat equalization periods between heating cycles. A mechanism of this type is shown in the Capita application, Serial Number 33,336 above referred to. In the embodiment illustrated in this application, however, the supply of current to the primary is diminished only for a period of time sufficient to permit passage of brushes from sections of commutator bars to obviate arcing between the brushes and commutator segments. Also, in place of reciprocating the coil to move the field of flux thereof out of the zone of the metallic member to be heated, a similar heating effect may be obtained by moving the support with the closure thereon into and out of the field generated by the coil.

After heating is effected, activation may be completed upon cooling of the shell. When adhesive lacquer is employed, this should be effected while the elements to be joined are held under pressure. Where egg albumen or other heat coagulatable adhesive is utilized, and cooling under pressure is not essential, the activation is completed when the head portion of the closure has reached the desired temperature.

By heating the metallic body forming part of the closure, and thus controlling the temperature existing at the decorated surface, the problems incident to closure assembly, and heretofore encountered where heat activation was accomplished by directing a gas flame in the vicinity of the top of the closure shell and thus heating the decoration to a considerably higher degree than that eventually reached upon transfer of heat from the decorated surface through the metallic shell and thence to the adhesive disposed thereon, are obviated.

While I have illustrated and described certain specific preferred embodiments of my invention, it will be understood that the invention is not limited to the form shown and described but may be otherwise embodied and practiced within the scope of the following claims.

I claim:

1. The method of softening a dry coating of adhesive on a metal disk, which includes the step of generating heat in the periphery of the disk only and intermittently effecting said generation of heat in the periphery of the disk until the temperature thereof is substantially uniform over its entire area and high enough to soften the coating.

2. The method of softening a dry coating of adhesive on a metal disk, which includes the step of generating heat in the periphery of the disk only by electric inductive action, permitting the heat to permeate the entire mass of the disk and intermittently effecting said generation of heat in the periphery of the disk a number of times until the temperature thereof is substantially uniform over its entire area and high enough to soften the coating.

3. The method of softening a dry coating of adhesive on a metal disk, which includes the step of generating heat in a particular part of the disk by subjecting it to the action of a sustained alternating magnetic field and effecting said generation of heat in a particular part of the disk a plurality of spaced times until the temperature of the entire disk is substantially uniform and high enough to soften the coating.

4. The method of softening a dry glue-like coating on a metal disk, which includes the step of subjecting the disk to repeated alternate localized heating and heat-equalization until the temperature of the entire disk is substantially uniform and high enough to soften the coating.

5. The method of softening a dry glue-like coating on a metal disk, which includes the step of raising the temperature of the coating by conducting substantially the same amount of heat per unit area of the coating to it from the disk itself in a plurality of distinct sequential steps.

6. The method of softening a dry glue-like coating on a metal disk, which includes the step of gradually raising the temperature of the coating by successive steps of non-uniform heating of the disk and substantial heat equalization therein to conduct heat to the coating and to soften the same uniformly over its entire area.

7. The method of softening one of two coatings which soften at different temperatures and are located on different sides of a thin metal disk, which includes the step of raising the temperature of the disk by a series of electric inductive actions thereon at a rate sufficient to soften the low-temperature coating in a predetermined time while retaining the higher-temperature coating substantially unchanged.

RALPH R. CLARK.